Patented Apr. 19, 1927.

1,625,022

UNITED STATES PATENT OFFICE.

JOSEPH FOUSEK, OF SAN FRANCISCO, CALIFORNIA.

PASTRY DOUGH.

No Drawing.   Application filed April 20, 1925. Serial No. 24,682.

This invention relates to prepared raw food products, and more particularly to a prepared and preserved cake, cookie, or like dough adapted for shipment in containers, such as jars, cans and the like to the trade for later distribution to customers.

This dough when prepared in accordance with my preservative process may be kept indefinitely in its original container for future use as required, the dough remaining sweet and palatable for a considerable length of time following the opening of its container, in fact, a quantity of this dough has been found, by actual test, to be in excellent condition after a period of two years.

The preservative qualities of this dough reside mainly in the character of the prepared and self-preserving egg mixture used in its preparation, and described in my Patent No. 1,597,186, issued August 26, 1926, Serial No. 24,683.

The principal object of this invention is to provide a cake, cookie, or like dough, of great keeping qualities, that may be placed in containers in quantities for trade supply and dispensed for use by housewives, as their needs may require, saving them the drudgery of preparation and an ever-ready batch of dough make-up upon which to draw in emergency cake and cookie baking, without fear of deterioration in quality or flavoring.

The composition of proportionate ingredients for a batch of dough should be substantially as follows: 2 pounds of sugar, ½ pound corn syrup, sufficient water to dissolve sugar.

The above are placed upon the fire and boiled, stirring the while to thoroughly mix, after which one pound of prepared and preserved egg preparation, which consists of frozen egg-yolks, honey or syrup, and salt, as described in my patent hereinafter referred to, and to be herein later more fully pointed out, is gradually poured into the boiling mass and stirred until smooth, after which there is added, while still hot, one pound of melted butter and two pounds of flour, grain or bran, to be constantly stirred until completely mixed, to which may be added before completion of stirring, as an assistant in leavening, a pinch of bi-carbonate of soda, or a few drops of vinegar, and a flavoring of any character desired. While still warm, the composition as thus prepared is poured into containers and sealed for future use.

It is absolutely essential to the successful preparation of this dough, as to keeping qualities, that the "egg preparation" previously referred to as a constituent element of the dough composition, be of the following composition: 13 pounds of egg-yolks, 9 pounds of sugar, 3 pounds of corn syrup, 6 ounces of salt; the frozen egg-yolks being first prepared by allowing them to stand in the unopened containers for a period of some four days at a temperature of eighty degrees Fahrenheit, to insure perfect thawing-out of the egg-yolks, after which the containers are opened and their contents removed to a mixing receptacle and the above ingredients added thereto, the whole to be thoroughly incorporated and reduced to a smooth pasty consistency.

The syrup acts more particularly as a mass softener, or solvent, to produce a smooth ungranulated mixture, while at the same time, in combination with the sugar, the necessary preserving agency is provided.

After thorough incorporation, the egg mixture should be allowed to stand from three to seven days, depending upon climatic conditions, to ripen, after which it will be found to be in condition to produce excellent results.

I claim :

The method of preparing a preserved food composition for making cakes, consisting in mixing together sugar and corn syrup with sufficient water to dissolve the sugar, boiling and stirring the mixture until thoroughly dissolved, adding to this mixture while still boiling a ripened egg preparation consisting of egg yolks first frozen and then thawed and incorporated with sugar, corn syrup and salt, next adding to the mixture thus obtained butter and flour together with flavoring and leavening agents, and finally pouring the admixture into containers and sealing.

In testimony whereof I have affixed my signature.

JOSEPH FOUSEK.